United States Patent
Lee et al.

(10) Patent No.: US 10,399,453 B2
(45) Date of Patent: Sep. 3, 2019

(54) METHOD AND SYSTEM FOR CONTROLLING VEHICULAR DIRECT CURRENT CONVERTER

(71) Applicants: Hyundai Motor Company, Seoul (KR); Kia Motors Corporation, Seoul (KR)

(72) Inventors: Ho Joong Lee, Gyeonggi-do (KR); Dong Jun Shin, Gyeonggi-do (KR); Won Kyoung Choi, Gyeonggi-Do (KR); Jun Yeon Park, Incheon (KR); Na Lae Kwon, Seoul (KR); Hyun Wook Seong, Gyeonggi-do (KR); Jee Heon Kim, Gyeonggi-Do (KR); Chang Ryeol Yoo, Incheon (KR); Dong Jun Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 118 days.

(21) Appl. No.: 15/807,089

(22) Filed: Nov. 8, 2017

(65) Prior Publication Data
US 2018/0354386 A1 Dec. 13, 2018

(30) Foreign Application Priority Data
Jun. 7, 2017 (KR) .................. 10-2017-0070894

(51) Int. Cl.
*B60L 53/20* (2019.01)
*B60L 58/13* (2019.01)
*B60L 7/16* (2006.01)
*B60L 11/18* (2006.01)

(52) U.S. Cl.
CPC .......... *B60L 11/1862* (2013.01); *B60L 7/16* (2013.01); *B60L 53/20* (2019.02); *B60L 58/13* (2019.02); *B60L 2210/10* (2013.01)

(58) Field of Classification Search
CPC ...... B60L 11/1862; B60L 53/20; B60L 58/13; B60L 7/16; B60L 2210/10
See application file for complete search history.

(56) References Cited

U.S. PATENT DOCUMENTS 8,880,264 B2 11/2014 Saito
2010/0318252 A1* 12/2010 Izumi .................. B60L 58/20
701/22

FOREIGN PATENT DOCUMENTS

| JP | 5346988 B2 | 11/2013 |
| KR | 2015-0075654 A | 7/2015 |
| KR | 2016-0086567 A | 7/2016 |

* cited by examiner

*Primary Examiner* — Robert L Deberadinis
(74) *Attorney, Agent, or Firm* — Mintz Levin Cohn Ferris Glovsky and Popeo, P.C.; Peter F. Corless

(57) ABSTRACT

A method and system for controlling a vehicular direct current converter are provided. In particular, zero-current control is performed during control for maintaining an SOC of an auxiliary battery. Accordingly, energy loss due to charging and discharging of the auxiliary battery is minimized and the fuel efficiency of a vehicle is improved.

14 Claims, 2 Drawing Sheets

METHOD AND SYSTEM FOR CONTROLLING VEHICULAR DIRECT CURRENT CONVERTER

CROSS-REFERENCE TO RELATED APPLICATION

This application claims the priority benefit of Korean Patent Application No. 10-2017-0070894, filed on Jun. 7, 2017 in the Korean Intellectual Property Office, the disclosure of which is incorporated herein by reference.

TECHNICAL FIELD

The present disclosure relates to a method and system for controlling a vehicular direct current converter and, more specifically, to a method and system for controlling a vehicular direct current converter in which zero-current control is performed during control for maintaining a state of charge (SOC) of an auxiliary battery, whereby energy loss due to charging and discharging of the auxiliary battery is minimized, to thus improve the fuel efficiency of a vehicle.

BACKGROUND

Environment-friendly vehicles including a hybrid vehicle, a plug-in hybrid vehicle, and an electric vehicle perform charging, discharging, and maintaining control of an auxiliary battery thereof for vehicle fuel efficiency and auxiliary battery protection according to driving conditions and a battery state through variable voltage control of a low-voltage direct current-direct current (DC-DC) converter (LDC). Additionally, LDC command voltage, which is configured to perform charging, discharging, and maintaining control, is determined using mapping work based on the state of charge (SOC) and the temperature of the auxiliary battery.

In a conventional auxiliary battery control method, the auxiliary battery is operated to maintain a mapped maintenance voltage thereof when the SOC of the auxiliary battery reaches a target value, and is operated by a charging voltage when the SOC of the auxiliary battery decreases. Since it is impossible to achieve voltage mapping capable of precisely maintaining a current of 0 A due to the temperature, the degree of deterioration, and the SOC error of the auxiliary battery, the SOC is maintained using continuous charging and discharging based on the target SOC.

In the conventional technology, the charging and discharging efficiency of the auxiliary battery is not 100%, and loss due to a charging and discharging current of the auxiliary battery thus inevitably occurs, thereby decreasing fuel efficiency. In addition, for SOC maintenance and discharge control of the auxiliary battery, the conventional technology requires command voltage mapping and calibration work according to SOCs and temperatures, which requires consumption of a substantial amount of man/hours (M/H). Therefore, a solution for improving fuel efficiency through minimally controlling charging and discharging of the auxiliary battery and reducing M/H required for calibration work is required.

The above description in this background section is merely for improving understanding of the background of the present disclosure, and should not be taken as an acknowledgement indicating that the information forms a prior art that is already known to a person skilled in the art.

SUMMARY

The present disclosure provides a method and system for operating a vehicular direct current converter in which zero-current control is performed during control for maintaining an SOC of an auxiliary battery, whereby energy loss due to charging and discharging of the auxiliary battery is minimized, and thus the fuel efficiency of a vehicle is improved.

In accordance with the above aspect, a method for controlling a vehicular direct current converter according to the present disclosure may include: detecting a state of charge (SOC) of a vehicular auxiliary battery; and, when the detected SOC of the auxiliary battery falls within a predetermined setting range, adjusting an output voltage of a vehicular direct current converter to allow the auxiliary battery to have zero current, to maintain the SOC of the auxiliary battery.

The method may further include after detecting the SOC of the auxiliary battery, discharging the auxiliary battery when the detected SOC of the auxiliary battery is greater than values within the predetermined setting range; and charging the auxiliary battery when the detected SOC of the auxiliary battery is less than the values within the predetermined setting range. In maintaining of the SOC of the auxiliary battery, the setting range may include a first setting range and a second setting range, having values less than those of the first setting range, and the output voltage of the vehicular direct current converter may be adjusted to allow the auxiliary battery to have zero current when the SOC of the auxiliary battery falls within the first setting range.

When the SOC of the auxiliary battery falls within the second setting range, the output voltage of the vehicular direct current converter may be adjusted to allow the auxiliary battery to have zero current based on a result obtained by determining whether regenerative braking is being performed or determining a state of an electric field load. The output voltage of the vehicular direct current converter may be adjusted to allow the auxiliary battery to have zero current when the SOC of the auxiliary battery falls within the second setting range and regenerative braking is not being performed or the electric field load is not in a preconfigured low-load state.

A method for controlling a vehicular direct current converter according to the present disclosure may include: selecting a control mode of a vehicular direct current converter based on a state of a vehicular auxiliary battery; when the selected control mode is a first control mode, detecting an SOC of the auxiliary battery and adjusting an output voltage of the vehicular direct current converter based on a map previously mapped with an SOC and an output voltage, corresponding to the SOC, of the vehicular direct current converter; and, when the selected control mode is a second control mode, detecting an SOC of the vehicular auxiliary battery, and, when the detected SOC of the auxiliary battery falls within a predetermined setting range, adjusting the output voltage of the vehicular direct current converter to allow the auxiliary battery to have zero current, to maintain the SOC of the auxiliary battery.

The maintaining of the SOC of the auxiliary battery may include: detecting an SOC of the vehicular auxiliary battery; discharging the auxiliary battery when the detected SOC of the auxiliary battery is greater than values within the predetermined setting range; and charging the auxiliary battery when the detected SOC of the auxiliary battery is less than the values within the predetermined setting range, wherein the setting range may include a first setting range and a second setting range having values less than those of the first setting range, and the output voltage of the vehicular direct current converter may be adjusted to allow the auxiliary battery to have zero current when the SOC of the auxiliary battery falls within the first setting range.

When the SOC of the auxiliary battery falls within the second setting range, the output voltage of the vehicular direct current converter may be adjusted to allow the auxiliary battery to have zero current based on a result obtained by determining whether regenerative braking is being performed or determining a state of an electric field load. The output voltage of the vehicular direct current converter may be adjusted to allow the auxiliary battery to have zero current when the SOC of the auxiliary battery falls within the second setting range and regenerative braking is not being performed or the electric field load is not in a preconfigured low-load state. Additionally, selecting of the control mode of the vehicular direct current converter may include: selecting the first control mode when the auxiliary battery is in a fail-safe state, an auxiliary battery protection state, or a high-electric-field-load-operation-requiring state; and selecting the second control mode when the auxiliary battery is in another state.

Moreover, a system for controlling a vehicular direct current converter according to the present disclosure may include: a vehicular auxiliary battery configured to supply electric power to an electric field load; a vehicular direct current converter configured to change a voltage level to charge the auxiliary battery; an auxiliary battery sensor configured to measure an SOC, a current, and a temperature of the auxiliary battery; and a controller configured to detect the SOC of the vehicular auxiliary battery and, when the detected SOC of the auxiliary battery falls within a predetermined setting range, adjust an output voltage of the vehicular direct current converter to allow the auxiliary battery to have zero current, to maintain the SOC of the auxiliary battery.

The controller may further be configured to select a control mode of the vehicular direct current converter based on a state of the vehicular auxiliary battery; when the selected control mode is a first control mode, detect an SOC of the auxiliary battery and adjust an output voltage of the vehicular direct current converter based on a map previously mapped with an SOC and an output voltage, corresponding to the SOC, of the vehicular direct current converter; and when the selected control mode is a second control mode, detect an SOC of the vehicular auxiliary battery and, when the detected SOC of the auxiliary battery falls within a predetermined setting range, adjust the output voltage of the vehicular direct current converter to allow the auxiliary battery to have zero current, to maintain the SOC of the auxiliary battery.

The setting range may include a first setting range and a second setting range having values less than those of the first setting range, and the controller may be configured to adjust the output voltage of the vehicular direct current converter to allow the auxiliary battery to have zero current when the SOC of the auxiliary battery falls within the first setting range. The controller may further be configured to adjust the output voltage of the vehicular direct current converter to allow the auxiliary battery to have zero current when the SOC of the auxiliary battery falls within the second setting range and regenerative braking is not being performed or an electric field load is not in a preconfigured low-load state.

According to a method and system for controlling a vehicular direct current converter of the present disclosure, zero-current control may be performed during control for maintaining an SOC of an auxiliary battery, whereby energy loss due to charging and discharging of the auxiliary battery is minimized, and thus the fuel efficiency of a vehicle may be improved. In addition, command voltage mapping according to SOCs and temperatures is unnecessary, and thus, M/H may be reduced. Further, variation of voltage is minimal and charging and discharging current of an auxiliary battery is reduced, and thus, deterioration may be prevented and durability may be increased.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
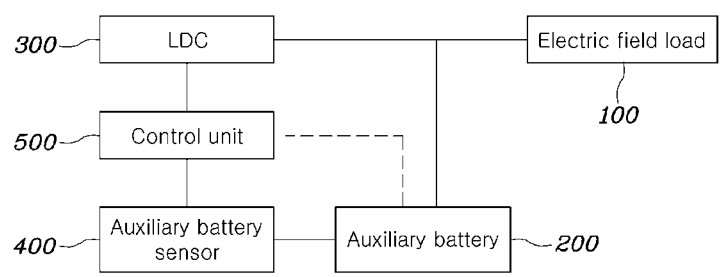
FIG. 1 is a configuration diagram of a system for controlling a vehicular direct current converter according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method and system for controlling a vehicular direct current converter according to various embodiments of the present disclosure will be described with reference to the accompanying drawings.

Figure 2:
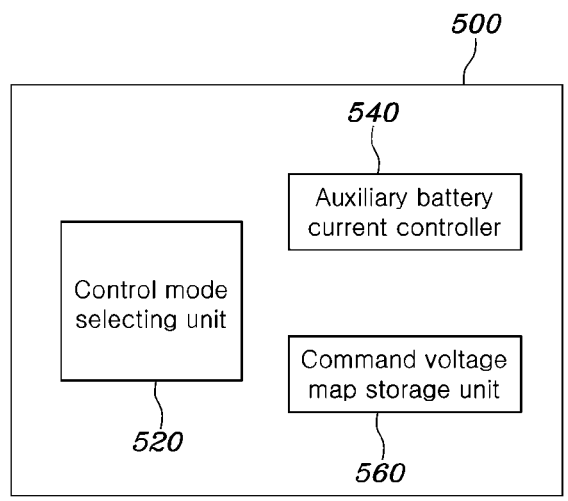
FIG. 2 is a configuration diagram of a controller of a system for controlling a vehicular direct current converter according to an exemplary embodiment of the present disclosure.
Figure 3:
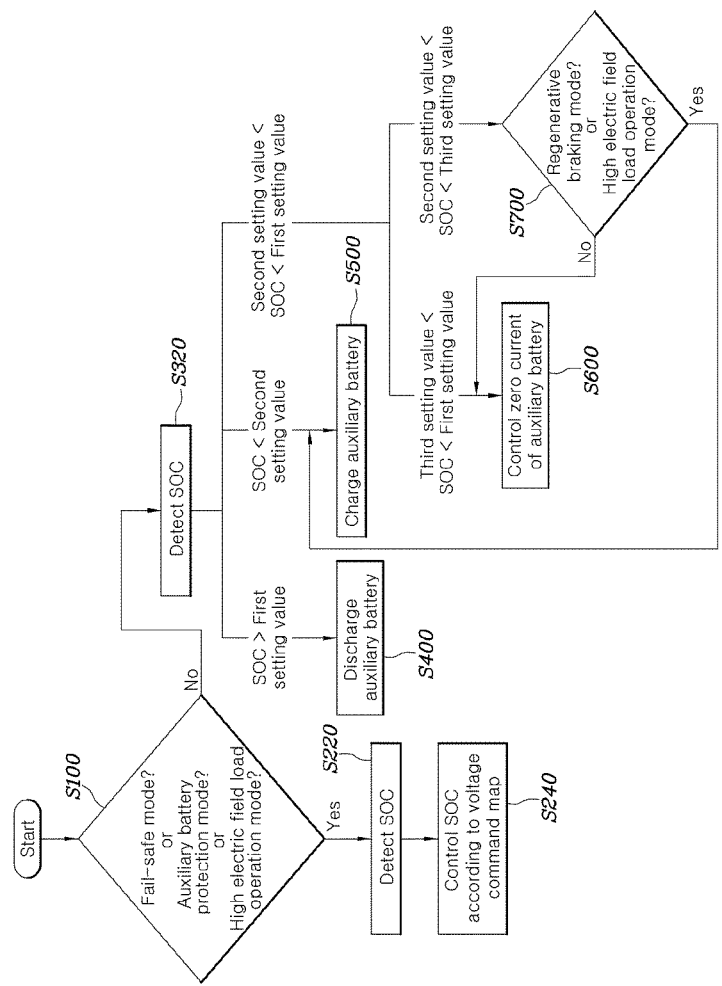
FIG. 3 is a flow chart of a method for controlling a vehicular direct current converter according to an exemplary embodiment of the present disclosure.

FIG. 1 is a configuration diagram of a system for controlling a vehicular direct current converter according to an exemplary embodiment of the present disclosure, FIG. 2 is a configuration diagram of a controller of a system for controlling a vehicular direct current converter according to an exemplary embodiment of the present disclosure, and FIG. 3 is a flow chart of a method for controlling a vehicular direct current converter according to an exemplary embodiment of the present disclosure.

Firstly, referring to FIG. 1, a system for controlling a vehicular direct current converter according to an exemplary embodiment of the present disclosure may include: a vehicular auxiliary battery 200 configured to supply electric power to an electric field load 100; a vehicular direct current converter 300 configured to change a voltage level to charge the auxiliary battery 200; an auxiliary battery sensor 400 configured to measure an SOC, a current, and a temperature of the auxiliary battery 200; and a controller 500 configured to detect a state of charge (SOC) of the vehicular auxiliary battery 200 and, when the detected SOC of the auxiliary battery 200 falls within a predetermined setting range, adjust an output voltage of the vehicular direct current converter 300 to allow the auxiliary battery 200 to have zero current, to maintain the SOC of the auxiliary battery 200. Referring to FIG. 2, the controller 500 may include a control mode selecting unit 520, an auxiliary battery current controller 540, and a command voltage map storage unit 560.

The vehicular direct current converter 300 according to an exemplary embodiment of the present disclosure may be a low-voltage DC-DC converter (LDC), and may be electrically connected to each of the electric field load 100 and the auxiliary battery 200 to directly supply electric power to the electric field load 100. Further, electric power may be supplied to the electric field load 100 through control by the auxiliary battery 200, instead of the direct current converter 300.

The auxiliary battery sensor 400 may be configured to measure a state of charge (SOC), a charging current, a charging voltage, and a temperature of the auxiliary battery 200, and information sensed by the auxiliary battery sensor 400 may be input to the controller 500. The predetermined setting range may include a first setting range and a second setting range having values less than those of the first setting range.

According to an exemplary embodiment of the present disclosure, the setting range for an SOC of the auxiliary battery 200 may be about 95%-30%, the first setting range may be an SOC of about 95%-65%, and the second setting range may be an SOC of about 65%-30%. In an exemplary embodiment of the present disclosure, discharging of the auxiliary battery 200 is required in a section in which an SOC of the auxiliary battery 200 is about 95% or more, charging is required in a section in which an SOC is about 30% or less, and maintaining an SOC is required to improve fuel efficiency of a vehicle in a section in which the SOC is a setting range of about 95%-30%. The setting range according to an exemplary embodiment of the present disclosure is divided into two sections, but the present disclosure is not limited thereto.

Furthermore, the controller 500 may be configured to detect a state of charge (SOC) from the auxiliary battery sensor 400, and when the detected SOC of the auxiliary battery 200 falls within the predetermined setting range, adjust an output voltage of the vehicular direct current converter 300 to allow the auxiliary battery 200 to have zero current, to maintain the SOC of the auxiliary battery 200.

In an exemplary embodiment of the present disclosure, the adjusting of the output voltage of the vehicular direct current converter 300 to allow the auxiliary battery 200 to have zero current when the SOC of the auxiliary battery 200 falls within the predetermined setting range corresponds to adjusting the output voltage of the vehicular direct current converter 300 to allow a sensed current value of the auxiliary battery 200 to follow on a current command value of 0 of the auxiliary battery 200 through proportional integral (PI) control of the auxiliary battery current controller 540. Accordingly, command voltage mapping according to SOCs and temperatures is unnecessary, and thus, M/H may be reduced. In addition, variation of voltage is minimal and charging and discharging current of the auxiliary battery is reduced, and thus, deterioration may be prevented and durability may be increased.

Additionally, the controller 500: may be configured to select a control mode of the vehicular direct current converter 300 based on a state of the vehicular auxiliary battery 200; when the selected control mode is a first control mode, detect an SOC of the auxiliary battery 200 and adjust an output voltage of the vehicular direct current converter 300 based on a map previously mapped with an SOC and an output voltage, corresponding to the SOC, of the vehicular direct current converter 300; and, when the selected control mode is a second control mode, detect an SOC of the vehicular auxiliary battery 200 and, when the detected SOC of the auxiliary battery 200 falls within the predetermined setting range, adjust the output voltage of the vehicular direct current converter 300 to allow the auxiliary battery 200 to have zero current, to maintain the SOC of the auxiliary battery 200.

In an exemplary embodiment of the present disclosure, the selecting of the first control mode of the vehicular direct current converter 300 according to the state of the auxiliary battery 200 corresponds to, when the auxiliary battery 200 is in an over-temperature state (e.g., fail-safe state), over-current flows in the auxiliary battery 200 (e.g., high electric field load state), or the SOC of the auxiliary battery 200 is less than a discharge prevention level (e.g., auxiliary battery protection state), adjusting the output voltage of the vehicular direct current converter 300 based on an SOC-based LDC output voltage map stored in the command voltage map storage unit 560, rather than performing zero-current control of the auxiliary battery 200. [NOTE: Please provide an example of an over-temperature state, if possible.]

Further, the operation of selecting the second control mode of the vehicular direct current converter 300 according to the state of the auxiliary battery 200, which does not correspond to when the auxiliary battery 200 is in an over-temperature state, overcurrent flows in the auxiliary battery 200, or the SOC of the auxiliary battery 200 is less than a discharge prevention level, may include: detecting, by the controller 500, an SOC of the vehicular auxiliary battery 200; and adjusting, by the controller 500, the output voltage of the vehicular direct current converter 300 to allow the auxiliary battery 200 to have zero current when the SOC of the auxiliary battery 200 falls within the predetermined setting range.

The controller 500 may be configured to adjust the output voltage of the vehicular direct current converter 300 to allow the auxiliary battery 200 to have zero current when the SOC of the auxiliary battery 200 falls within the first setting range. When the SOC of the auxiliary battery 200 falls within the first setting range, the controller 500 may be configured to adjust an LDC output voltage to allow the auxiliary battery 200 to have zero current through the PI control of the auxiliary battery current controller 540 described above. The controller 500 may be configured to adjust the output voltage of the vehicular direct current converter 300 to allow the auxiliary battery 200 to have zero current when the SOC of the auxiliary battery 200 falls within the second setting range and regenerative braking is not being performed or the electric field load 100 is not in a preconfigured low-load state.

As described above, zero-current control of the auxiliary battery 200 is performed according to a determination on whether regenerative braking is being performed or whether the electric field load 100 is in a low-load state. This conditional control enables charging control of the auxiliary battery 200 to be performed when charging efficiency is high and, when the charging efficiency is not high, enables zero-current control to be performed to minimize charging and discharging loss and prevent the durability of the auxiliary battery from deteriorating. The expression that the electric field load 100 is in a low-load state may imply that the load has a value less than 10 A, as an exemplary embodiment of the present disclosure.

When the auxiliary battery 200 has an SOC that falls within the second setting range, and is in a low-charge-efficiency state in which regenerative braking is not being performed or the electric field load 100 is not in the preconfigured low-load state, the controller 500 may be configured to adjust an LDC output voltage to allow the auxiliary battery 200 to have zero current through PI control of the auxiliary battery current controller 540 described above. Through the zero-current control, it may be possible to minimize loss due to charging and discharging and prevent the durability of the auxiliary battery from deteriorating. When the auxiliary battery 200 has an SOC that falls within the second setting range and is in a high charge efficiency state, i.e., the state where regenerative braking is being performed or the electric field load 100 is in the preconfigured low-load state, the controller 500 may be configured to execute charging control of the auxiliary battery 200. The method to be described herein below may be executed by the controller 500.

Referring to FIG. 3, a method for controlling a vehicular direct current converter according to an exemplary embodiment of the present disclosure may include: detecting a state of charge (SOC) of a vehicular auxiliary battery (S320); and, when the detected SOC of the auxiliary battery falls within a predetermined setting range, adjusting an output voltage of the vehicular direct current converter 300 to allow the auxiliary battery to have zero current to maintain the SOC of the auxiliary battery (S600).

The detecting of the SOC of the vehicular auxiliary battery (S320) may include detecting a state of charge, i.e., an SOC of the auxiliary battery 200 using an auxiliary battery sensor 400. The method may further include, after the detecting of the SOC of the auxiliary battery (S320), discharging the auxiliary battery 200 when the detected SOC of the auxiliary battery 200 is greater than values within the predetermined setting range (S400); and charging the auxiliary battery when the detected SOC of the auxiliary battery is less than the values within the predetermined setting range (S500).

According to an exemplary embodiment of the present disclosure as described above, the setting range for an SOC of the auxiliary battery 200 may be about 95%-30%. The discharging of the auxiliary battery 200 when the detected SOC of the auxiliary battery 200 is greater than the values within the predetermined setting range (e.g., the SOC is greater than about 95%) (S400) corresponds to performing control for supplying electric power to the electric field load by the auxiliary battery 200, not the vehicular direct current converter 300. The charging of the auxiliary battery 200 when the detected SOC of the auxiliary battery 200 is less than the values within the predetermined setting range (e.g., the SOC is less than bout 30%) (S500) corresponds to performing control for charging the auxiliary battery 200 when the SOC is less than a discharge prevention level.

Further, the controller 500 may be configured to adjust the output voltage of the vehicular direct current converter 300 based on the SOC-based LDC output voltage map stored in the command voltage map storage unit 560, as described above, when discharging the auxiliary battery 200 when the detected SOC of the auxiliary battery 200 is greater than the values within the predetermined setting range, or charging the auxiliary battery 200 when the detected SOC of the auxiliary battery 200 is less than the values within the predetermined setting range.

In the maintaining of the SOC of the auxiliary battery, the setting range may include a first setting range and a second setting range having values less than those of the first setting range, and the output voltage of the vehicular direct current converter 300 may be adjusted to allow the auxiliary battery 200 to have zero current when the SOC of the auxiliary battery 200 falls within the first setting range (S600).

According to an exemplary embodiment of the present disclosure, the first setting range may be an SOC of about 95%-65%, and the second setting range may be an SOC of about 65%-30%. In an exemplary embodiment of the present disclosure, discharging of the auxiliary battery 200 is required in a section in which an SOC of the auxiliary battery 200 is about 95% or more, charging is required in a section in which an SOC is about 30% or less, and maintaining an SOC is required to improve the fuel efficiency of the vehicle in a section in which the SOC is a setting range of about 95%-30%.

Additionally, the adjusting of the output voltage of the vehicular direct current converter 300 to allow the auxiliary battery 200 to have zero current when the SOC of the auxiliary battery 200 falls within the first setting range corresponds to adjusting the output voltage of the vehicular direct current converter 300 to allow a sensed current value of the auxiliary battery 200 to converge on the current command value of 0 of the auxiliary battery 200 through PI control of the auxiliary battery current controller 540, according to an exemplary embodiment of the present disclosure as described above. When the SOC of the auxiliary battery 200 falls within the second setting range, the controller 500 may be configured to adjust the output voltage of the vehicular direct current converter 300 to allow the auxiliary battery 200 to have zero current according to a result obtained by determining whether regenerative braking is being performed or determining a state of the electric field load (S700).

As described above, zero-current control of the auxiliary battery 200 is performed according to a determination of whether regenerative braking is being performed or whether the electric field load 100 is in a low-load state. This conditional control enables charging control of the auxiliary battery 200 to be performed when charging efficiency is high, and when the charging efficiency is not high, enables zero-current control to be performed to minimize charging and discharging loss and prevent the durability of the auxiliary battery 200 from deteriorating, as described above. The expression that the electric field load 100 is in a low-load state may imply that the load has a value less than 10 A, as an exemplary embodiment of the present disclosure.

When the auxiliary battery 200 has an SOC that falls within the second setting range, and regenerative braking is not being performed or the electric field load is not in a preconfigured low-load state, the output voltage of the vehicular direct current converter 300 is adjusted to allow the auxiliary battery 200 to have zero current (S600 and S700).

When the auxiliary battery 200 has an SOC that falls within the second setting range and is in a low-charge-efficiency state in which regenerative braking is not being performed or the electric field load is not in the preconfigured low-load state, the controller 500 may be configured to adjust an LDC output voltage to allow the auxiliary battery 200 to have zero current using PI control of the auxiliary battery current controller 540 as described above. Through the zero-current control, it may be possible to minimize loss due to charging and discharging and prevent the durability of the auxiliary battery 200 from deteriorating.

When the auxiliary battery 200 has an SOC that falls within the second setting range, and is in a high charge efficiency state, i.e., the state where regenerative braking is being performed or the electric field load is in the preconfigured low-load state, the controller 500 may be configured to execute charging control of the auxiliary battery 200 by adjusting the output voltage of the vehicular direct current converter 300 based on an SOC-based LDC output voltage map stored in the command voltage map storage unit 560 (S500 and S700).

A method for controlling a vehicular direct current converter according to an exemplary embodiment of the present disclosure may include: selecting a control mode of a vehicular direct current converter 300 based on a state of a vehicular auxiliary battery 200 (S100); when the selected control mode is a first control mode, detecting an SOC of the auxiliary battery 200 and adjusting an output voltage of the vehicular direct current converter 300 based on a map previously mapped with an SOC and an output voltage, corresponding to the SOC, of the vehicular direct current converter 300 (S220 and S240); and, when the selected control mode is a second control mode, detecting an SOC of the auxiliary battery 200, and, when the detected SOC of the auxiliary battery 200 falls within a predetermined setting range, adjusting the output voltage of the vehicular direct current converter 300 to allow the auxiliary battery 200 to have zero current, to maintain the SOC of the auxiliary battery 200 (S320 and S600).

In the selecting of the control mode of the vehicular direct current converter (S100), the controller 500 may be configured to select the first control mode when the auxiliary battery 200 is in a fail-safe state, a protection mode state of the auxiliary battery 200, or a high-electric-field-load-operation-requiring state. Otherwise, the controller 500 may be configured to select the second control mode. The case where the auxiliary battery 200 is in the fail-safe state, the protection state of the auxiliary battery (200), or the high-electric-field-load-operation-requiring state may correspond to the case where the auxiliary battery 200 is in an over-temperature state (fail-safe state), overcurrent flows in the auxiliary battery 200 (high electric field load state), or the SOC of the auxiliary battery 200 is less than a discharge prevention level (auxiliary battery protection state), according to an exemplary embodiment of the present disclosure.

When the selected control mode is the first control mode, detecting an SOC of the auxiliary battery 200 and adjusting an output voltage of the vehicular direct current converter 300 based on a map previously mapped with an SOC and an output voltage, corresponding to the SOC, of vehicular direct current converter 300, when the auxiliary battery 200 is in the fail-safe state, the auxiliary battery protection state, or the high-electric-field-load-operation-requiring state, according to an exemplary embodiment of the present disclosure as described above (S220 and S240), the controller 500 may be configured to adjust the output voltage of the vehicular direct current converter 300 based on an SOC-based LDC output voltage map stored in the command voltage map storage unit 560, rather than perform zero-current control of the auxiliary battery 200.

When the selected control mode is the second control mode, detecting an SOC of the vehicular auxiliary battery 200 and, when the detected SOC of the auxiliary battery 200 falls within the predetermined setting range, adjusting an output voltage of the vehicular direct current converter 300 to allow the auxiliary battery 200 to have zero current, to maintain the SOC of the auxiliary battery 200, the state of the auxiliary battery 200 may be determined to correspond to none of the fail-safe state, the protection state of the auxiliary battery 200, and the high-electric-field-load-operation-requiring state, and an SOC of the vehicular auxiliary battery 200 may be detected. Then, when the SOC of the auxiliary battery 200 falls within the predetermined setting range, the output voltage of the vehicular direct current converter 300 may be adjusted to allow the auxiliary battery 200 to have zero current.

In the maintaining of the SOC of the auxiliary battery (S320 and S600), the controller 500 may be configured to detect an SOC of the vehicular auxiliary battery 200 (S320); discharge the auxiliary battery 200 when the detected SOC of the auxiliary battery 200 is greater than values of the predetermined setting range (S400); and charge the auxiliary battery 200 when the detected SOC of the auxiliary battery 200 is less than the values of the predetermined setting range (S500). The setting range may include a first setting range and a second setting range having values less than those of the first setting range, and the output voltage of the vehicular direct current converter 300 may be adjusted to allow the auxiliary battery 200 to have zero current when the SOC of the auxiliary battery 200 falls within the first setting range (S600). The predetermined setting range, the discharging and charging of the auxiliary battery 200, and the adjusting of the output voltage of the vehicular direct current converter 300 to allow the auxiliary battery 200 to have zero current are the same as those in the exemplary embodiments described above.

When the SOC of the auxiliary battery 200 falls within the second setting range, the controller 500 may be configured to adjust the output voltage of the vehicular direct current converter 300 to allow the auxiliary battery 200 to have zero current according to a result obtained by determining whether regenerative braking is being performed or determining a state of an electric field load (S600 and S700). The controller 500 may be configured to adjust the output voltage of the vehicular direct current converter 300 to allow the auxiliary battery 200 to have zero current when the SOC of the auxiliary battery 200 falls within the second setting range and regenerative braking is not being performed or the electric field load is not in the preconfigured low-load state. The adjusting of the output voltage of the vehicular direct current converter 300 to allow the auxiliary battery 200 to have zero current by determining whether regenerative braking is being performed or determining a state of the electric field load is the same as that in the exemplary embodiment described above.

As described above, in the method and system for controlling the vehicular direct current converter according to various exemplary embodiments of the present disclosure, energy loss due to charging and discharging of the auxiliary battery is minimized during control for maintaining an SOC of the auxiliary battery, and thus, the fuel efficiency of the vehicle may be improved. Command voltage mapping based on SOCs and temperatures is unnecessary, and thus, M/H may be reduced. In addition, variation of voltages is minimal and charging and discharging current of the auxiliary battery is reduced, and thus, deterioration may be prevented and durability may be increased.

A particular exemplary embodiment of the present disclosure has been illustrated and described, but various changes and modifications would be obvious to a person ordinarily skilled in the art without departing from the technical idea of the present disclosure, provided by the following claims.

What is claimed is:

1. A method for controlling a vehicular direct current converter, comprising:
    detecting, by a controller, a state of charge (SOC) of a vehicular auxiliary battery; and
    when the detected SOC of the auxiliary battery falls within a predetermined setting range, adjusting, by the controller, an output voltage of a vehicular direct current converter to allow the auxiliary battery to have zero current and maintain the SOC of the auxiliary battery.

2. The method of claim 1, wherein after detecting the SOC of the auxiliary battery, the method further includes:
    discharging, by the controller, the auxiliary battery when the detected SOC of the auxiliary battery is greater than values within the predetermined setting range; and
    charging, by the controller, the auxiliary battery when the detected SOC of the auxiliary battery is less than the values within the predetermined setting range.

3. The method of claim 1, wherein, in the maintaining of the SOC of the auxiliary battery, the setting range includes a first setting range and a second setting range having values less than values within the first setting range, and the output voltage of the vehicular direct current converter is adjusted to allow the auxiliary battery to have zero current when the SOC of the auxiliary battery falls within the first setting range.

4. The method of claim 3, wherein, when the SOC of the auxiliary battery falls within the second setting range, the output voltage of the vehicular direct current converter is adjusted to allow the auxiliary battery to have zero current based on a result obtained by determining whether regenerative braking is being performed or determining a state of an electric field load.

5. The method of claim 4, wherein, when the SOC of the auxiliary battery falls within the second setting range and regenerative braking is not being performed or the electric field load is not in a preconfigured low-load state, the output voltage of the vehicular direct current converter is adjusted to allow the auxiliary battery to have zero current.

6. A method for controlling a vehicular direct current converter, comprising:
    selecting, by a controller, a control mode of a vehicular direct current converter based on a state of a vehicular auxiliary battery;
    when the selected control mode is a first control mode, detecting, by the controller, a state of charge (SOC) of the auxiliary battery and adjusting an output voltage of the vehicular direct current converter based on a map previously mapped with an SOC and an output voltage, corresponding to the SOC, of the vehicular direct current converter; and
    when the selected control mode is a second control mode, detecting, by the controller, an SOC of the vehicular auxiliary battery, and, when the detected SOC of the auxiliary battery falls within a predetermined setting range, adjusting the output voltage of the vehicular direct current converter to allow the auxiliary battery to have zero current and maintain the SOC of the auxiliary battery.

7. The method of claim 6, wherein the maintaining of the SOC of the auxiliary battery includes:
    detecting, by the controller, the SOC of the vehicular auxiliary battery; discharging the auxiliary battery when the detected SOC of the auxiliary battery is greater than values within the predetermined setting range; and charging the auxiliary battery when the detected SOC of the auxiliary battery is less than the values within the predetermined setting range,
    wherein the setting range includes a first setting range and a second setting range having values less than those of the first setting range, and the output voltage of the vehicular direct current converter is adjusted to allow the auxiliary battery to have zero current when the SOC of the auxiliary battery falls within the first setting range.

8. The method of claim 7, wherein, when the SOC of the auxiliary battery falls within the second setting range, the output voltage of the vehicular direct current converter is adjusted to allow the auxiliary battery to have zero current based on a result obtained by determining whether regenerative braking is being performed or determining a state of an electric field load.

9. The method of claim 8, wherein, when the SOC of the auxiliary battery falls within the second setting range and regenerative braking is not being performed or the electric field load is not in a preconfigured low-load state, the output voltage of the vehicular direct current converter is adjusted to allow the auxiliary battery to have zero current.

10. The method of claim 6, wherein the selecting of the control mode of the vehicular direct current converter includes:
    selecting, by the controller, the first control mode when the auxiliary battery is in a fail-safe state, an auxiliary battery protection state, or a high-electric-field-load-operation-requiring state; and
    selecting, by the controller, the second control mode when the auxiliary battery is in another state.

11. A system for controlling a vehicular direct current converter, comprising:
- a vehicular auxiliary battery configured to supply electric power to an electric field load;
- a vehicular direct current converter configured to change a voltage level to charge the auxiliary battery;
- an auxiliary battery sensor configured to measure a state of charge (SOC), a current, and a temperature of the auxiliary battery; and
- a controller configured to detect an SOC of the vehicular auxiliary battery and, when the detected SOC of the auxiliary battery falls within a predetermined setting range, adjust an output voltage of the vehicular direct current converter to allow the auxiliary battery to have zero current and maintain the SOC of the auxiliary battery.

12. The system of claim 11, wherein the controller is configured to:
- select a control mode of the vehicular direct current converter based on a state of the vehicular auxiliary battery;
- when the selected control mode is a first control mode, detect the SOC of the auxiliary battery and adjust the output voltage of the vehicular direct current converter based on a map previously mapped with an SOC and an output voltage, corresponding to the SOC, of the vehicular direct current converter; and
- when the selected control mode is a second control mode, detect the SOC of the vehicular auxiliary battery and, when the detected SOC of the auxiliary battery falls within the predetermined setting range, adjust the output voltage of the vehicular direct current converter to allow the auxiliary battery to have zero current and maintain the SOC of the auxiliary battery.

13. The system of claim 11, wherein the setting range includes a first setting range and a second setting range having values less than those of the first setting range, and the controller is configured to adjust the output voltage of the vehicular direct current converter to allow the auxiliary battery to have zero current when the SOC of the auxiliary battery falls within the first setting range.

14. The system of claim 13, wherein the controller is configured to adjust the output voltage of the vehicular direct current converter to allow the auxiliary battery to have zero current when the SOC of the auxiliary battery falls within the second setting range and regenerative braking is not being performed or an electric field load is not in a preconfigured low-load state.

* * * * *